United States Patent [19]

Söffge et al.

[11] Patent Number: 4,604,915
[45] Date of Patent: Aug. 12, 1986

[54] DRIVE SYSTEM FOR A ROTARY-, PIVOT-, AND PROPELLING-DRIVE OF A VEHICLE ESPECIALLY OF AN EXCAVATING MACHINE

[75] Inventors: Friedhelm Söffge; Hans-Peter Knauss, both of Leonberg, Fed. Rep. of Germany

[73] Assignee: Ing. h.c.F. Porsche AG, Fed. Rep. of Germany

[21] Appl. No.: 558,430

[22] Filed: Dec. 6, 1983

[30] Foreign Application Priority Data

Dec. 10, 1982 [DE] Fed. Rep. of Germany ....... 3245720

[51] Int. Cl.⁴ .......................... F16H 3/44; F16H 57/10
[52] U.S. Cl. .................... 74/790; 74/750 R; 74/760; 74/781 R; 188/170
[58] Field of Search ............ 74/750 R, 760, 782, 74/781 R, 801, 790; 188/18 A, 71.1, 170

[56] References Cited

U.S. PATENT DOCUMENTS

| | | | |
|---|---|---|---|
| 2,762,233 | 9/1956 | Orr | 74/781 R X |
| 3,296,893 | 1/1967 | Shaffer et al. | 74/750 R |
| 3,351,157 | 11/1967 | Claveau | 188/18 A |
| 3,500,970 | 3/1970 | Schilling | 188/170 |
| 3,686,978 | 8/1972 | Knoblach et al. | 74/750 R X |
| 3,754,625 | 8/1973 | Voth et al. | 74/801 X |
| 3,797,325 | 3/1974 | Christison | 74/750 R X |
| 3,812,928 | 5/1974 | Rockwell et al. | 74/801 X |
| 3,937,293 | 2/1976 | Susdorf | 74/750 R X |
| 3,954,026 | 5/1976 | Rittmann et al. | 188/71.1 X |
| 4,010,830 | 3/1977 | Logus et al. | 188/18 A X |
| 4,050,329 | 9/1977 | Zaiser et al. | 74/750 R |
| 4,116,293 | 9/1978 | Fukui | 74/801 X |
| 4,128,023 | 12/1978 | Kinder | 74/750 R |
| 4,210,229 | 7/1980 | Rees | 188/18 A |
| 4,391,351 | 7/1983 | Jirousek et al. | 74/781 R X |
| 4,424,874 | 1/1984 | Koike et al. | 74/801 X |

FOREIGN PATENT DOCUMENTS

| | | | |
|---|---|---|---|
| 2726775 | 12/1977 | Fed. Rep. of Germany ... | 188/18 A |
| WO81/03469 | 10/1981 | World Int. Prop. O. ........ | 188/18 A |
| 1455069 | 11/1976 | United Kingdom ............ | 188/18 A |
| 0948701 | 8/1982 | U.S.S.R. .......................... | 74/750 R |

*Primary Examiner*—Kenneth J. Dorner
*Assistant Examiner*—Shirish Desai
*Attorney, Agent, or Firm*—Craig and Burns

[57] ABSTRACT

A drive system for a rotary-, pivot- and propelling-drive of a vehicle especially for an excavating machine with a planetary gear transmission and a brake installation that includes a brake disk with brake surfaces which are arranged between brake lamellae. A support of the brake lamellae takes place by way of teeth for the planet wheels of the transmission which are already present on the inside of the housing (in a ring gear) whereby the hub of the brake disk is axially displaceably retained in already present teeth of the sun gear of the transmission.

4 Claims, 6 Drawing Figures

DRIVE SYSTEM FOR A ROTARY-, PIVOT-, AND PROPELLING-DRIVE OF A VEHICLE ESPECIALLY OF AN EXCAVATING MACHINE

The present invention relates to a drive system for a rotary-, pivot and propulsion-drive of a vehicle, especially of an excavating machine.

Brake installations in planetary gear transmissions for rotating mechanisms of excavating machines as well as for chain drives of vehicles have become known in the prior art which include a multi-disk brake with an axial support arranged between a drive shaft and the transmission. These types of installations exhibit a considerable structural length, necessitated by the brake disk pairs disposed one behind the other. They are necessary in order to produce the necessary braking moment notwithstanding a relatively small diameter of the brake disks. These known brake installations require a large structural space and include a relatively large number of structural elements and by reason of the large number of brake lamellae have an unfavorable idling behavior, conditioned by occurring residual frictions.

It is the task of the present invention to improve a brake installation in a drive system of the aforementioned type to the effect that a more powerful and more sturdy brake results together with an arrangement relatively short in its construction, which additionally is simple and readily accessible.

The underlying problems are solved according to the present invention in that the brake installation includes a brake disk which is supported on the side of the input shaft, on the teeth of a sun gear of the planetary gear transmission and is arranged between two brake lamellae which are retained on the inside of the cylindrically constructed housing in teeth for the planets of the transmission and whereby a pressure disk connected with the housing forms a support for the brake lamellae on the side of the housing.

The advantages principally achieved with the present invention consist in that already present teeth of the planetary gear transmission, for example, the teeth of the sun gear as well as the teeth for the planets are used for the support and displacement of the brake installation, especially for the brake disk and the brake lamellae. A maximum utilization of the brake lever arm for achieving a large brake moment becomes possible by the direct support of the brake moment at the transmission housing in the construction of the pivot drive and in the construction of the chain drive according to the present invention. Consequently, it is not necessary to use several cooperating brake disks, respectively, brake lamellae as is known from the German Offenlegungsschrift No. 23 61 022.

A further advantage consists in that in a construction in which a carrier fixedly connected with a gear supporting the brake lamellae, an idling friction between the lamellae and the brake surfaces is avoided by a spring engaging at the brake disk and acting opposite the braking position so that no additional wear as well as no impairments to rotation can take place.

For the operating safety and reliability of the brake, the pressure disk which is supported in the housing by way of a support ring that is clampingly secured in an annular groove, is provided with a groove limiting the position thereof. This assures in a simple manner that the support ring cannot slide out of its groove in the housing and that the correct position is assumed during the assembly.

By an additional arrangement of a further actuating piston in the main actuating piston, the brake installation of the present invention can be used as stopping and/or also as operating brake.

The arrangement of the brake installation in a driving gear or sprocket for a chain-type vehicle results in advantages owing to its small structural length insofar as the driving motor can now be arranged in the wheel hub inside of the chain contour and costly reversing gears from the motor to the transmission input shaft can be avoided.

These and further objects, features and advantages of the present invention will become more apparent from the following description when taken in connection with the accompanying drawing which shows, for purposes of illustration only, several embodiments in accordance with the present invention and wherein.

Figure 1:
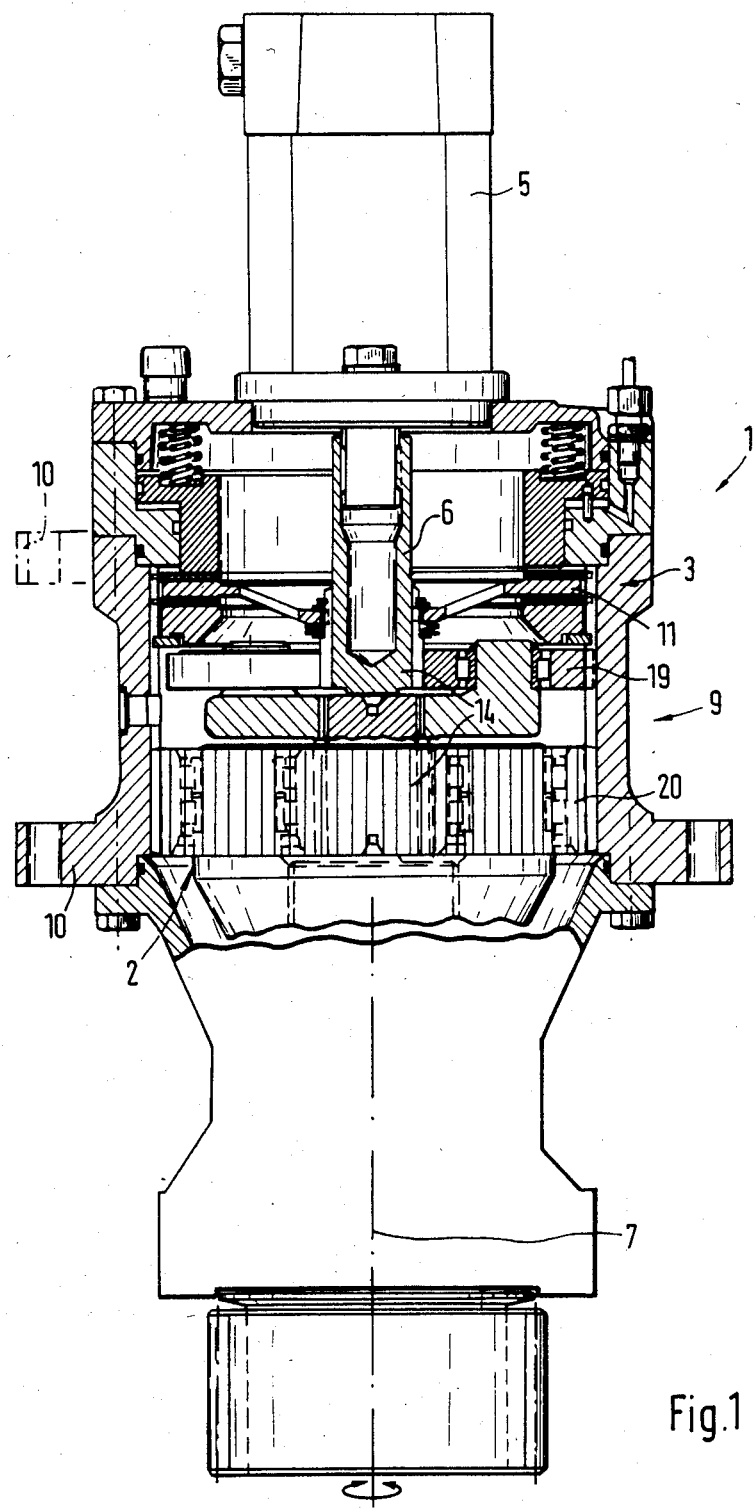
FIG. 1 is a cross-sectional view through a planetary gear with a brake installation for a rotating mechanism of an excavating machine in accordance with the present invention.

Referring now to the drawing wherein like reference numerals are used throughout the various views to designate like parts, a drive system generally designated by reference numeral 1 for a pivot drive of an excavating machine is illustrated in FIG. 1, which includes a multi-stage planetary gear transmission generally designated by reference numeral 2 having a brake installation generally designated by reference numeral 3. An essentially similar brake installation generally designated by reference numeral 4 is provided in a planetary gear transmission 2' for a chain drive of a vehicle which is illustrated in detail in FIGS. 3 and 4. In the following description of the various figures, the same reference numerals are used for similar parts of the brake installation in the two embodiments according to FIGS. 1 and 3.

The planetary gear transmission 2 of the pivot drive according to FIG. 1 is driven from a motor 5, such as a hydraulic or electric motor, by way of a motor output shaft 6 which is connected with the transmission input shaft 7. An output takes place by way of the transmission input shaft 7 which at the end thereof includes a gear that cooperates with a toothed rim at the vehicle body, which is not illustrated in detail herein.

The planetary gear transmission 2 is arranged in a fixed housing 9 consisting of a cylindrically shaped hollow body 13 and is connected with the vehicle by way of a formed-on flange 10. The part of the housing 9 having the flange 10 can also be installed as indicated in dash and dotted lines in FIG. 1, depending on the installation conditions.

The brake installation 3 is constructed as spring-loaded automatic safety brake and includes essentially one brake disk 11 retained in an already present toothed arrangement 12 of the motor output shaft 6. The brake disk 11 is axially displaceably retained in the teeth 12 and extends up to the largest inner diameter D of the cylindrically shaped hollow body 13. The toothed arrangement 12 is constructed uninterruptedly and corresponds to the teeth of the sun gear 14 for the planetary gear transmission 2. The brake disk 11 is arranged with its brake surfaces 15 and 15a between two brake lamellae 16 and 17. The brake lamellae 16 and 17 are axially displaceably retained on the inside of the hollow body 13 in an already present toothed arrangement 18. This toothed arrangement 18 is also constructed uninterruptedly and forms at the same time the teeth for engagement with the planet gears 19 and 20 of the transmission 2, for example, the teeth of a ring gear engaging with the planet gears 19 and 20.

A pressure disk 21 serves as abutment for absorbing and transmitting brake forces, which is retained by way of a support ring 22 arranged in an annular groove 50 of the inner wall of the hollow body 13.

The pressure disk 21 is provided in its external surface with a groove or recess 34 on the edge side thereof, in which is arranged the support ring 22. This groove or recess 34 forms an inner boundary for the support ring 22 in the radial movement direction thereof, which support ring is constructed, for example, as expanding ring.

In order that the axial load of the support ring 22 is as small as possible, the pressure disk 21 includes a circularly shaped raised portion 35. It has an outer diameter which corresponds approximately to the largest inner diameter D (FIGS. 2a and 2b) of the hollow body 13.

A conventional actuating piston 23 is arranged opposite the pressure disk 21, which is guided within the hollow body 13 and which includes between itself and the pressure disk 21, the brake disk 11 and the lamellae 16 and 17. The actuating piston 23 is constantly kept under a spring-stress in the direction of arrow 25 by way of a compression spring 24, whereby a braking takes place as is illustrated more clearly in FIG. 2a. For disengaging the brake installation 3, a pressure medium is introduced into a space 26 between the piston 23 and a housing projection 28 by way of a feed line 29. As a result thereof, a movement is imparted to the piston 23 against the force of the compression spring 24 in the direction of arrow 27 for disengaging the brake installation 3 which is illustrated in detail in FIG. 2b.

The hub 30 of the brake disk 11 is axially displaceably retained between end abutments 31 and 32. In order that an idling friction is avoided between the brake surfaces 15, 15a and the brake lamellae 16 and 17 during the disengagement of the brake in the direction of arrow 27, a spring 33 acting in the opening position of the brake (direction of arrow 27) is arranged between the end abutment 32 and the hub 30 of the brake disk 11.

Figure 2:
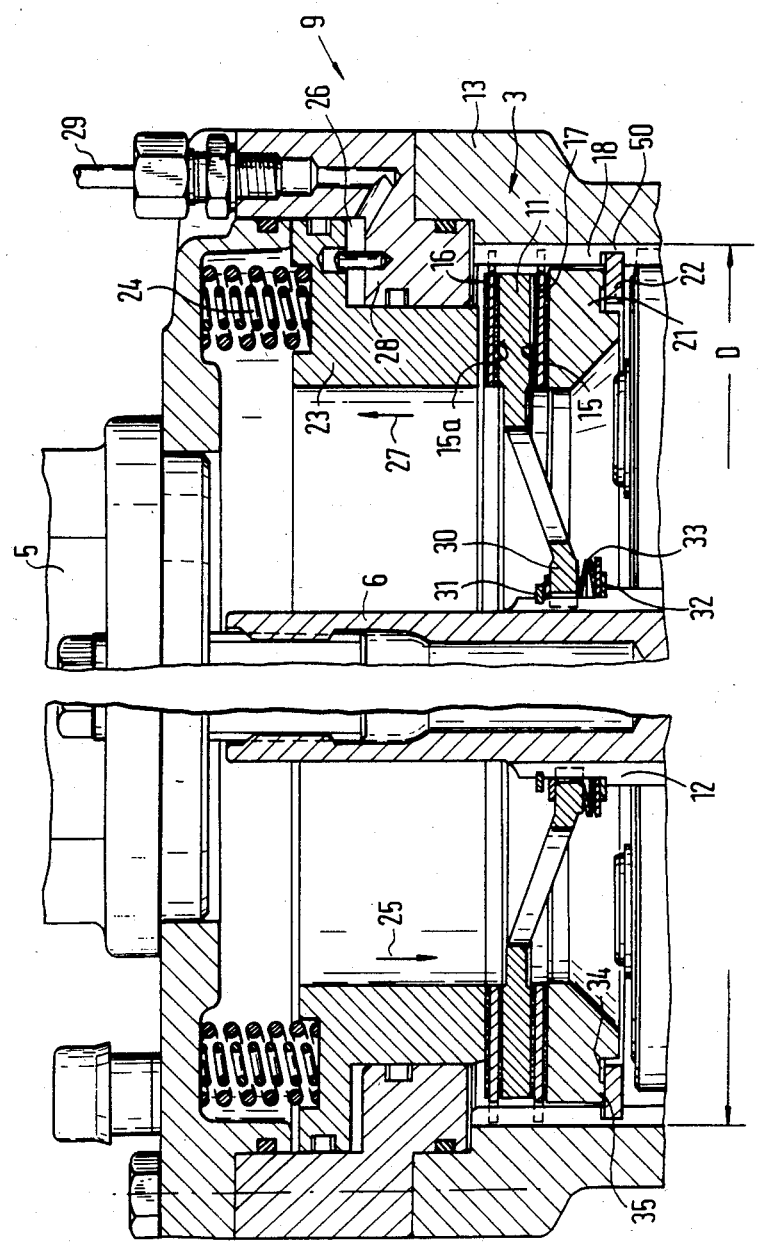
FIG. 2a is an enlarged cross-sectional view of the brake installation according to FIG. 1, in the engaged position of the brake.
FIG. 2b is a cross-sectional view, on an enlarged scale, of the brake installation according to FIG. 1, in the disengaged position of the brake.
Figure 3:
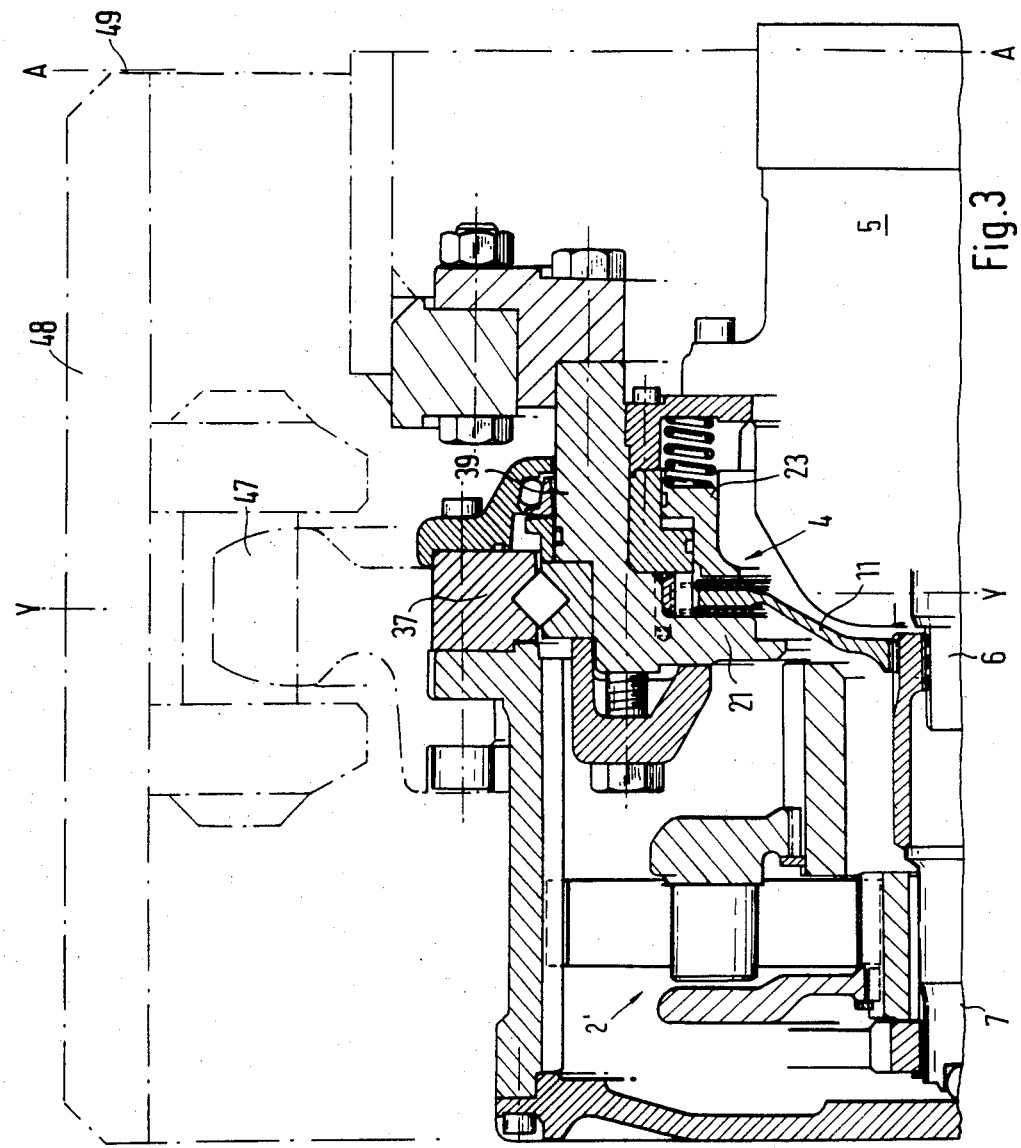
FIG. 3 is a cross-sectional view through a planetary gear transmission with a brake installation in accordance with the present invention for a chain drive of a vehicle.
Figure 4:
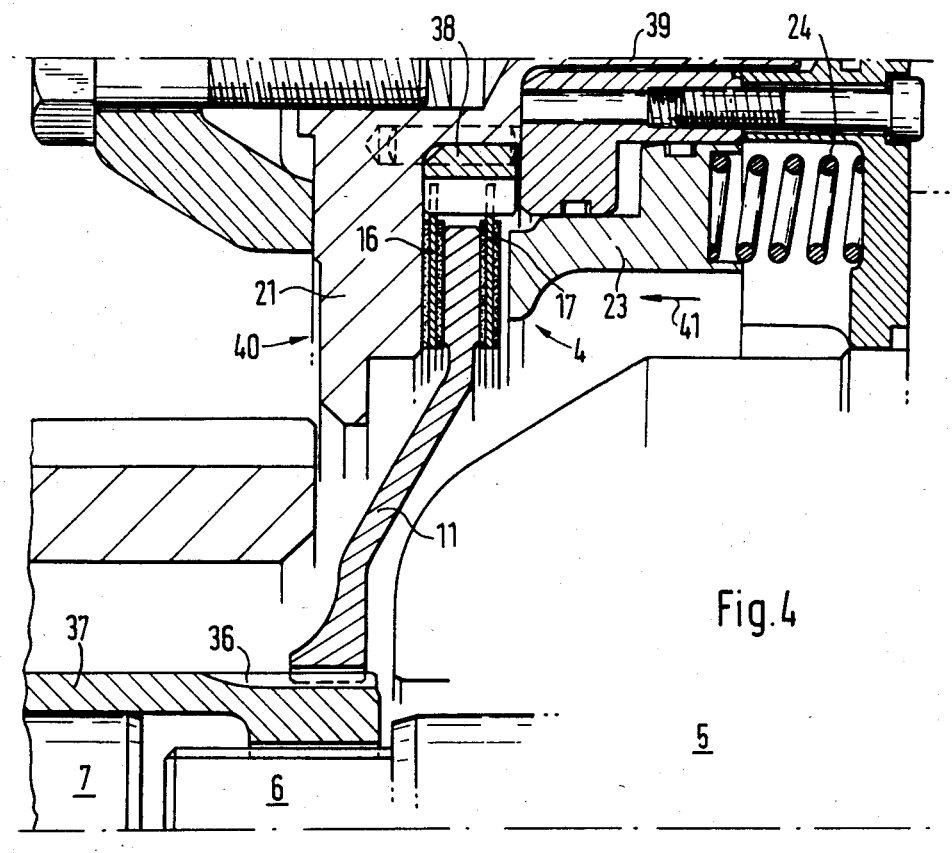
FIG. 4 is an enlarged partial cross-sectional view of the brake installatin according to FIG. 3.

The brake installation 4 according to FIGS. 3 and 4 corresponds essentially to the brake installation 3 of FIGS. 1 and 2. It includes a planetary gear transmission 2' and a brake disk 11 which is axially displaceably retained in a toothed arrangement 36 of the transmission input shaft 7. The brake lamellae 16 and 17 are axially displaceably arranged in a gear 38 which is connected with a fixed sleeve-like carrier 39. The carrier 39 includes an extension 40 that forms the pressure disk 21. The actuating piston 23 of the brake installation is arranged opposite the pressure disk 21. The actuating piston 23 is subjected to the spring-stress of the compression spring 24 which urges the actuating piston 23 in the direction of arrow 41 for the engagement of the brake. The opening of the brake installation takes place as in the brake installation 3 according to FIG. 1.

The brake disk of the construction according to FIGS. 3 and 4 extends approximately in the vertical longitudinal center plane y—y (FIG. 3) of the driving gear 47, whence the motor 5 assumes a position inside of the chain contours, i.e., the rear housing boundary of the motor 5 extends to the rear of a vertical plane A—A delimited by the inner chain edge 49. Additionally, the carrier 39 is extended up to the vertical plane y—y so that the brake installation 3 is located between the carrier 39 and the driving motor 5. A support takes place by way of a single bearing 37 which is arranged approximately in the plane y—y.

Figure 5:
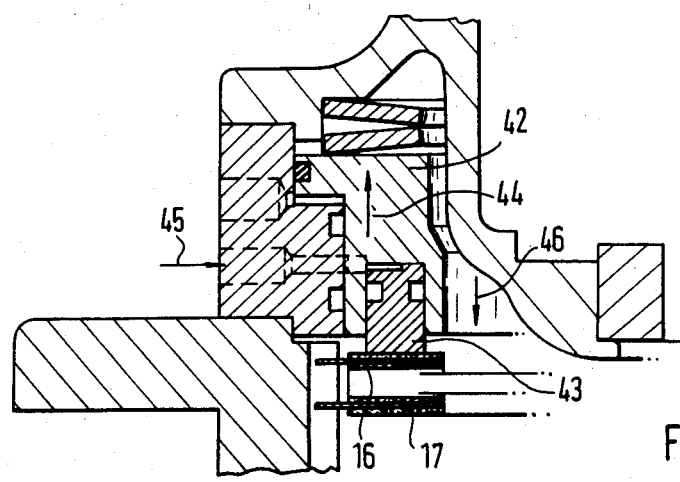
FIG. 5 is a cross-sectional view through a brake installation with two actuating pistons for an operating and fixing brake.

According to a further embodiment of the brake installation of the present invention according to FIG. 5, the latter, for use as operating and stopping brake, may include a first actuating piston 42 which corresponds essentially to the actuating piston 23 of the brake installations 3 and 4. A further actuating piston 43 acted upon by pressure medium is displaceably arranged in this piston 42. For the actuation of the operating brake, the piston 42 is acted upon with pressure so that it carries out a movement in the direction of arrow 44 up to the abutment at the housing. Thereafter, the further piston 43 is acted upon with pressure by way of the feed line 45 so that it carries out a movement in the direction of arrow 46 and presses the lamellae 16 and 17 against the brake surfaces 15 and 15a of the brake disk 11 and brings about a braking action.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A drive system for a travelling drive of a vehicle, a driving motor, via an engine output shaft, being connected with a planetary gear having a gear input shaft, and the shafts interacting with a pressure-medium-actuated braking device provided approximately in a vertical longitudinal central plane of a driving gear, and interacting with a spring loading arrangement disposed in a housing of the planetary gear and includes a brake disk which is supported on a toothing of the input shaft and is arranged between two brake plates, wherein the brake plates are held in a toothed wheel that is connected with a stationary pinion cage, and wherein the cage extends into the vertical longitudinal central plane, and wherein the braking device is connected between said cage and the driving motor, and a single bearing arranged in the vertical longitudinal central plane for support of the braking device in said bearing.

2. A drive system according to claim 1, wherein a hub of the brake disk, in an auxiliary slidable manner, is held on a sun wheel toothing of the engine output shaft between end abutments, further comprising a spring being arranged between one abutment and the hub of said brake disk is operable in an opening position of the brake.

3. A drive system according to claim 1, wherein the driving motor is arranged inside the cage, said driving motor extending between the brake disk and a vertical plane that is limited by an inside edge of a chain.

4. A drive system according to claim 2, wherein the driving motor is arranged inside the cage, said driving motor extending between the brake disk and a vertical plane that is limited by an inside edge of a chain.

* * * * *